US010224557B2

(12) United States Patent
Yoshioka et al.

(10) Patent No.: US 10,224,557 B2
(45) Date of Patent: Mar. 5, 2019

(54) FUEL CELL SYSTEM

(71) Applicant: AISAN KOGYO KABUSHIKI KAISHA, Obu-shi, Aichi-ken (JP)

(72) Inventors: Mamoru Yoshioka, Nagoya (JP); Masashi Takeda, Toyota (JP); Kazuhiro Yoneshige, Nagoya (JP)

(73) Assignee: AISAN KOGYO KABUSHIKI KAISHA, Obu (JP)

( * ) Notice: Subject to any disclaimer, the term of this patent is extended or adjusted under 35 U.S.C. 154(b) by 0 days.

(21) Appl. No.: 15/640,670

(22) Filed: Jul. 3, 2017

(65) Prior Publication Data

US 2018/0034080 A1 Feb. 1, 2018

(30) Foreign Application Priority Data

Jul. 26, 2016 (JP) ................................ 2016-146157

(51) Int. Cl.

| | |
|---|---|
| ***H01M 8/04119*** | (2016.01) |
| ***H01M 8/04082*** | (2016.01) |
| ***H01M 8/04014*** | (2016.01) |
| ***H01M 8/04089*** | (2016.01) |
| ***H01M 8/04291*** | (2016.01) |

(52) U.S. Cl.

CPC ... *H01M 8/04156* (2013.01); *H01M 8/04014* (2013.01); *H01M 8/04089* (2013.01); *H01M 8/04201* (2013.01); *H01M 8/04291* (2013.01); *H01M 2250/20* (2013.01); *Y02T 90/32* (2013.01)

(58) Field of Classification Search

CPC ............................ H01M 8/04156; H01M 8/04

See application file for complete search history.

(56) References Cited

U.S. PATENT DOCUMENTS 6,338,472 B1 * 1/2002 Shimazu ............. B01F 3/04049 261/29

2010/0279191 A1 * 11/2010 Matsuura .......... H01M 8/04164 429/443

FOREIGN PATENT DOCUMENTS

JP 2009-135006 A 6/2009

JP 2016-105380 A 6/2016

* cited by examiner

*Primary Examiner* — James Lee

(74) *Attorney, Agent, or Firm* — Oliff PLC

(57) ABSTRACT

A fuel cell system comprises a fuel cell for generating electricity with the supply of hydrogen gas and air, a hydrogen supply unit for supplying the hydrogen gas to the fuel cell, an air supply unit for supplying the air to the fuel cell, and a produced water atomizing apparatus for atomizing the produced water produced in association with electricity generation in the fuel cell and emitting the atomized water to the atmosphere. The air supply unit includes an air pump for pressure-feeding the air to the fuel cell, and the produced water atomizing apparatus includes an aspirator to atomize the produced water by use of the air emitted from the air pump as operation air. The air emitted from the air pump is cooled by an intercooler. The air utilized in the aspirator as the operation air is supplied to the aspirator on an upstream side of the intercooler.

4 Claims, 3 Drawing Sheets

FUEL CELL SYSTEM

CROSS-REFERENCE TO RELATED APPLICATIONS

This application is based upon and claims the benefit of priority from the prior Japanese Patent Application No. 2016-146157 filed on Jul. 26, 2016, the entire contents of which are incorporated herein by reference.

BACKGROUND

Technical Field

The technique disclosed in this specification relates to a fuel cell system configured to atomize and diffuse produced water which is produced in association with generation of electricity in the fuel cell.

Related Art

Heretofore, in a fuel cell, water is produced in association with generation of electricity. When the fuel cell is mounted in a vehicle or the like, therefore, the produced water needs to be appropriately disposed of. In general, the produced water is discharged outside and disposed of, but in this case, there needs to take an action to prevent any inconveniences caused by splash of the discharged water splashing onto peripheral objects. Specifically, when the fuel cell is mounted in an automobile, the produced water having been discharged outside may splash onto the following vehicle, obstructing a visual field of a driver on the following vehicle. Various improvements have been proposed to address this problem. For example, the Japanese Patent Application Publication No. 2009-135006 (JP2009-135006A) teaches a fuel cell system related to this type of technique. The system includes a fuel cell mounted in a vehicle, a discharge member to atomize and discharge the produced water produced in association with electricity generation in the fuel cell, and a discharge control member to control the discharge member according to a specified situation. The discharge member is configured such that the produced water, which has been separated by a vapor liquid separator, is stored in a reservoir tank. Subsequently, the water is pressure-fed to an injector by a pump provided with a motor and then atomized and sprayed onto the road surface through the injector. According to this system, the produced water is atomized and sprayed onto the road surface, so that adhesion of water droplets on the following vehicle is prevented.

SUMMARY

Technical Problems

However, in the system of JP2009-135006A, the produced water is pressure-fed by the pump and then atomized and sprayed onto the road surface through the injector, and accordingly, there needs to provide a pump and an injector specialized for atomization of the produced water. Namely, components including a driving source such as a motor need to be prepared just for a device of atomizing the produced water, so that the device tends to be complicated. A fuel cell system is usually provided with a great number of components for its basic configuration, and accordingly, there has been a demand for reducing components and driving sources which are used for attached equipment such as the discharge member so that the configuration can be simplified as most as possible.

The present disclosure has been made in view of the above circumstance and has a purpose of providing a fuel cell system configured to atomize the produced water with a relatively simple configuration.

Means of Solving the Problems

To achieve the above purpose, one aspect of the present disclosure provides a fuel cell system comprising: a fuel cell configured to generate electricity with the supply of fuel and an oxidizer; a fuel supply path for supplying the fuel to the fuel cell; an oxidizer supply path for supplying the oxidizer to the fuel cell; an oxidizer pump provided on the oxidizer supply path to pressure-feed the oxidizer to the fuel cell; an aspirator configured to atomize produced water produced in association with generation of electricity in the fuel cell; a produced water supply path for supplying the produced water from the fuel cell to the aspirator; and an operation fluid supply path for supplying operation fluid to the aspirator, wherein the oxidizer is used as the operation fluid and supplied to the aspirator, the oxidizer having been compressed and emitted from the oxidizer pump to be introduced in the operation fluid supply path through the oxidizer supply path.

According to the technique described above, the aspirator itself does not need a driving source, and thus there is no need to provide a supply member including a driving source specialized for supplying an operation fluid to the aspirator, achieving a relatively simple configuration of atomizing the produced water.

DETAILED DESCRIPTION OF THE EXEMPLARY EMBODIMENTS

First Embodiment

A first embodiment embodying a fuel cell system to an electric vehicle is now explained in detail with reference to the accompanying drawings.

Figure 1:
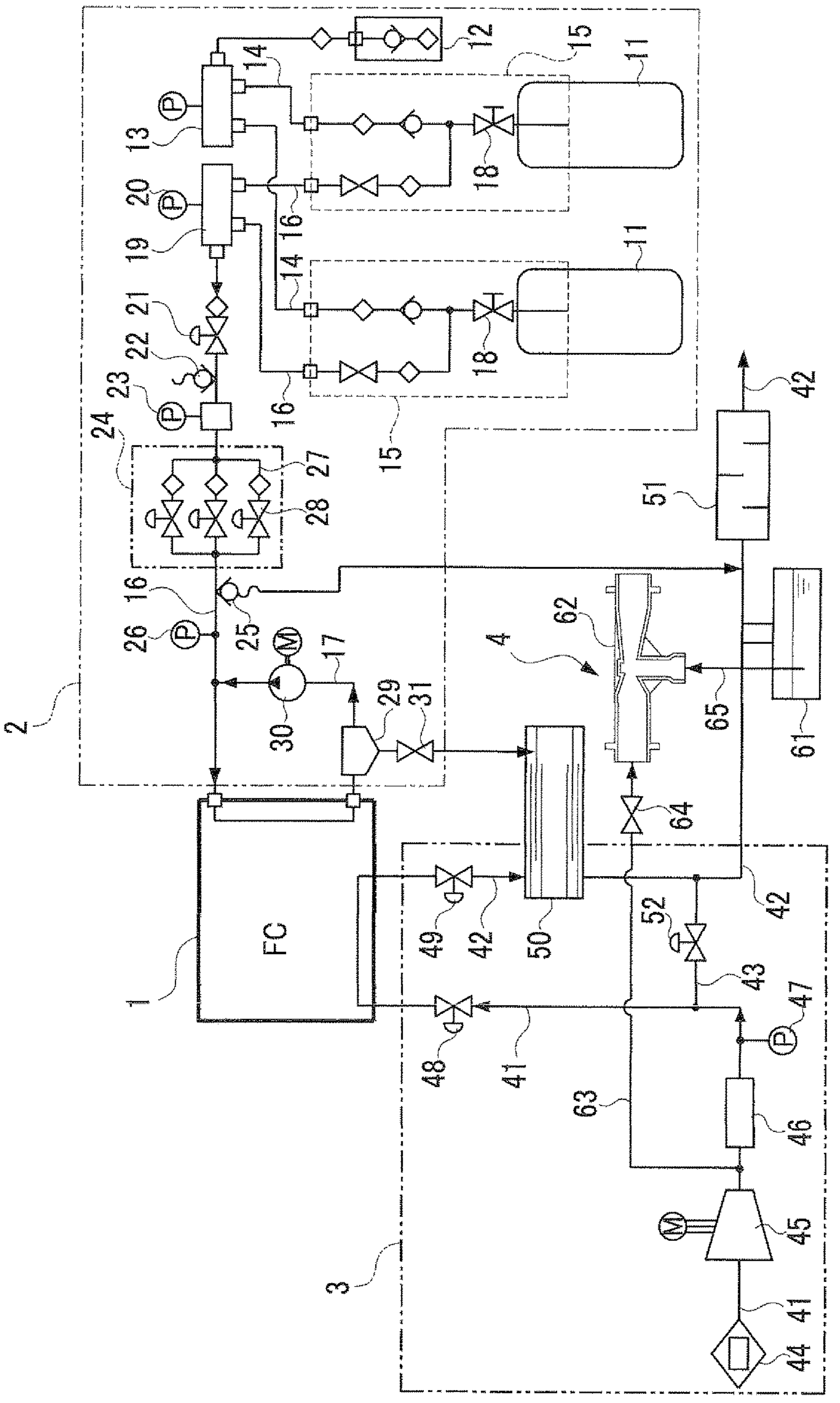
FIG. 1 is a schematic configurational view of a fuel cell system in a first embodiment.

FIG. 1 is a schematic configurational view of a fuel cell system according to the present embodiment. This fuel cell system is mounted in an electric vehicle and used for supplying electric power to its drive motor (not shown). The fuel cell system is provided with a fuel cell (FC) 1 to generate electricity with the supply of hydrogen gas as a fuel and air as an oxidizer. The electric power generated in the fuel cell 1 will be supplied to a drive motor (not shown) through an inverter (not shown).

On an anode side of the fuel cell 1, a hydrogen supply unit 2 to supply hydrogen gas to the fuel cell 1 is provided. The hydrogen supply unit 2 corresponds to one example of a fuel supply member of the present disclosure and is provided with a plurality of hydrogen cylinders 11. Those hydrogen cylinders 11 are to be filled with hydrogen gas supplied from hydrogen filling ports 12 via branch pipes 13, hydrogen filling paths 14, and passage switching units 15, respectively. The hydrogen supply unit 2 is further provided with hydrogen supply paths 16 to supply the hydrogen gas from the plurality of hydrogen cylinders 11 to the fuel cell 1 and a hydrogen discharge path 17 to reflux hydrogen off-gas that is discharged from the fuel cell 1 to the hydrogen supply paths 16. Each of the above-mentioned passage switching units 15 includes a main stop valve 18. This main stop valve 18 constituted by a solenoid valve is configured to switch supply and suspension of supply of the hydrogen gas from the hydrogen cylinder 11 to the hydrogen supply path 16. Each hydrogen supply path 16 corresponds to one example of a fuel supply path of the present disclosure.

On the hydrogen supply paths 16 downstream of the passage switching units 15, a merging pipe 19, a primary pressure sensor 20, a high-pressure regulator 21, a middle-pressure relief valve 22, a secondary pressure sensor 23, a hydrogen flow rate regulating device 24, a low-pressure relief valve 25, and a tertiary pressure sensor 26 are provided in this order from an upstream side of the paths 16. To the fuel cell 1, the hydrogen gas is supplied through those components 19 to 26 from each of the hydrogen cylinders 11. The primary sensor 20 is made to detect pressure of the hydrogen gas flown out of the hydrogen cylinders 11 as primary pressure. The high-pressure regulator 21 is made to reduce the pressure of the hydrogen gas. The middle-pressure relief valve 22 is made to emit the excessive hydrogen gas which becomes in excess at the time of decompressing the hydrogen gas by the high-pressure regulator 21. The secondary pressure sensor 23 is made to detect the pressure of the hydrogen gas downstream of the middle-pressure relief valve 22 as secondary pressure. The hydrogen flow rate regulating device 24 includes a delivery pipe 27 and a plurality of injectors 28 adapted to regulate or adjust the flow rate and the pressure of the hydrogen gas which will be supplied to the fuel cell 1. The low-pressure relief valve 25 is made to emit the surplus hydrogen gas, which becomes in excess at the time of regulating the pressure of the hydrogen gas by the hydrogen flow rate regulating device 24, to an air discharge path 42 which will be mentioned later. The tertiary pressure sensor 26 is made to detect the pressure of the hydrogen gas downstream of the low-pressure relief valve 25 as tertiary pressure.

On the hydrogen discharge path 17, a vapor liquid separator 29 and a hydrogen pump 30 are provided. Hydrogen off-gas discharged from the fuel cell 1 is to be returned to the hydrogen supply paths 16 through those components 29 and 30. The vapor liquid separator 29 is made to separate the produced water from the hydrogen off-gas flowing through the hydrogen discharge path 17. The vapor liquid separator 29 is provided on its discharge side with a discharge valve 31. This discharge valve 31 has an outlet connected to a reservoir tank 50 which will be mentioned later. The discharge valve 31 constituted by a solenoid valve is adapted to open the valve to flow the produced water separated by the vapor liquid separator 29 into the reservoir tank 50. The produced water is water produced in association with the electricity generation in the fuel cell 1. The hydrogen pump 30 including a motor as a driving source pressure-feeds the hydrogen off-gas to the hydrogen supply paths 16.

On a cathode side of the fuel cell 1, an air supply unit 3 to supply air to the fuel cell 1 is provided. The air supply unit 3 corresponds to one example of an oxidizer supply member of the present disclosure and is provided with an air supply path 41 to supply air to the fuel cell 1, an air discharge path 42 in which air off-gas discharged from the fuel cell 1 flows, and an air bypass path 43 bypassing the air supply path 41 and the air discharge path 42. On the air supply path 41, an air cleaner 44, an air pump 45, an intercooler 46, an air pressure sensor 47, and an air inlet valve 48 are provided in this order from an upstream side of the path 41. Outside air is supplied to the fuel cell 1 through those components 44 to 48. The air cleaner 44 is made to clean the air flowing into the air supply path 41. The air pump 45 including a motor as a driving source corresponds to one example of an oxidizer pump of the present disclosure and is made to pressure-feed the air to the fuel cell 1. The intercooler 46 is made to cool the air flown out of the air pump 45. The air pressure sensor 47 is made to detect pressure of the air flown out of the air pump 45. The air inlet valve 48 constituted by a solenoid valve is made to regulate the flow rate of the air which is to be supplied to the fuel cell 1. The air supply path 41 corresponds to one example of an oxidizer supply path of the present disclosure.

The air discharge path 42 is provided with an air outlet valve 49, the reservoir tank 50, and a muffler 51 in this order from an upstream side of the path 42. Air off-gas flowing from the fuel cell 1 to the air discharge path 42 is made to be discharged outside through those components 49 to 51. The air outlet valve 49 constituted by a solenoid valve is made to regulate flow rate of the air off-gas which will be flown out of the fuel cell 1. The reservoir tank 50 is made to store the produced water produced in the fuel cell 1 and discharge the surplus produced water to the air discharge path 42. The muffler 51 is made to decompress the discharged air-off gas. The air bypass passage 43 is provided with an air bypass valve 52. The air bypass valve 52 constituted by a solenoid valve is made to regulate the flow rate of the air flowing through the air bypass path 43.

In the above configuration, the hydrogen gas flown out of the hydrogen cylinders 11 to the hydrogen supply paths 16 is decompressed by the high-pressure regulator 21. The hydrogen gas is then adjusted its flow rate and pressure in the hydrogen flow rate regulating device 24. Subsequently, the hydrogen gas is supplied to the fuel cell 1. The hydrogen gas supplied to the fuel cell 1 is used for the electricity generation in the cell 1, and after that, the gas is flown out of the cell 1 as the hydrogen off-gas to the hydrogen discharge path 17 and returned to the hydrogen supply paths 16 via the vapor liquid separator 29 and the hydrogen pump 30.

Further, in the above configuration, operation of the air pump 45 causes air inflow to the air supply path 41 through the air cleaner 44, and the thus flown air is cooled by the intercooler 46. The air is subsequently supplied to the fuel cell 1 via the air inlet valve 48. The air supplied to the fuel cell 1 is used for the electricity generation in the cell 1, and after that, the air is flown out of the cell 1 as the air off-gas to the air discharge path 42 and discharged outside via the reservoir tank 50 and the muffler 51. At this time, the surplus produced water overflowing from the reservoir tank 50 is let flown with the air off-gas to the air discharge path 42.

This fuel cell system further includes a produced water atomizing apparatus 4 to atomize the produced water produced in association with the electricity generation in the fuel cell 1 and to discharge the atomized produced water to the atmosphere. The atomizing apparatus 4 is provided with a produced water trap tank 61 provided on the air discharge path 42, an aspirator 62 to aspirate and atomize the produced water reserved in the tank 61, an operation air supply path 63 to supply the air as an operation fluid (operation air) to the aspirator 62, and an open/close valve 64 provided on the path 63. In the present embodiment, an inlet of the operation air supply path 63 is connected to the air supply path 41 downstream of the air pump 45 and upstream of the intercooler 46. The produced water trap tank 61 is made to collect and store the surplus produced water which has overflowed from the reservoir tank 50 and flown through the air discharge path 42 with the air off-gas. The produced water trap tank 61 is connected to the aspirator 62 via a produced water supply path 65. In the present embodiment, the aspirator 62 corresponds to one example of an atomizing member of the present disclosure and is made to atomize the produced water by utilizing the air emitted from the air pump 45 as the operation air. Namely, in the present embodiment, there is no specialized pump for supplying the operation air to the aspirator 62, and instead, the air pump 45 is utilized as a pump for supplying the operation air, and the air flowing through the air supply path 41 is utilized as the operation air for the aspirator 62. The operation air supply path 63 corresponds to one example of an operation fluid supply path of the present disclosure.

Figure 2:
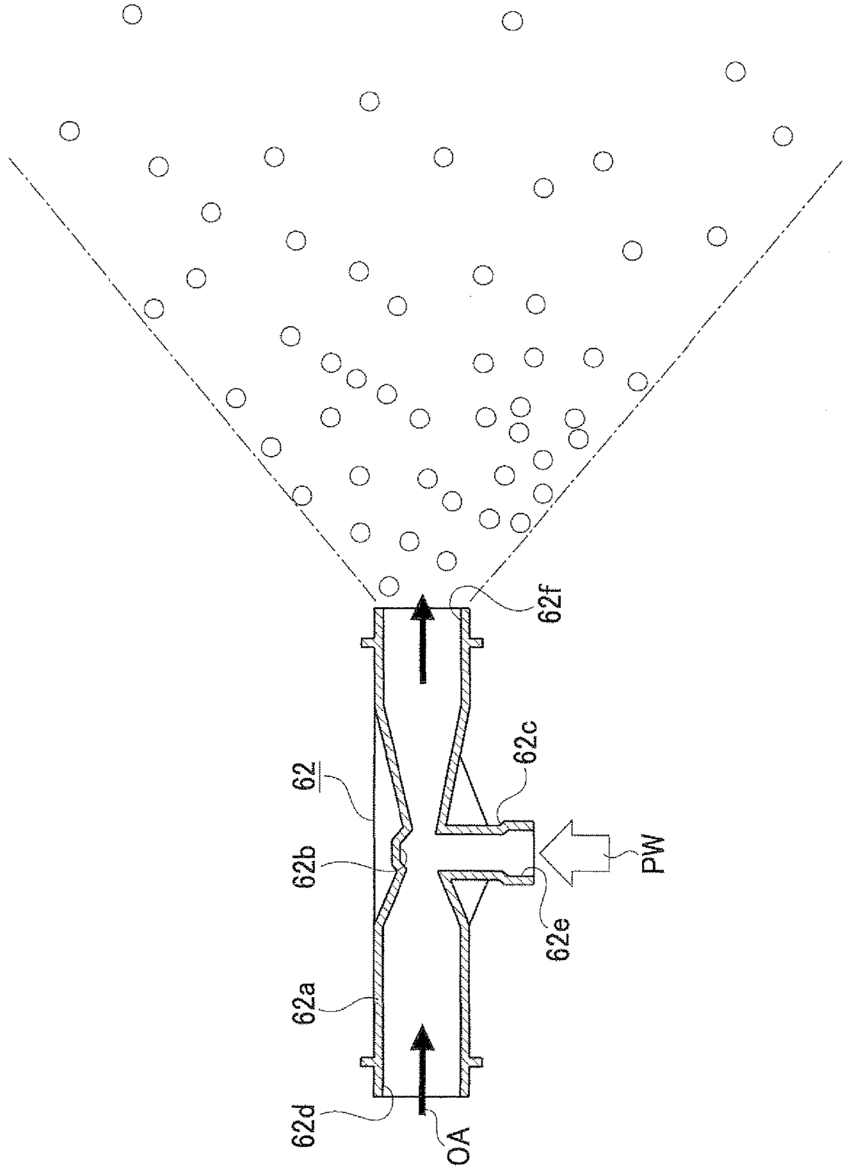
FIG. 2 is a sectional view of an aspirator in the first embodiment.

FIG. 2 is a sectional view of the aspirator 62. The aspirator 62, formed in a T-shaped pipe-like shape as a whole, includes a main pipe 62*a*, a throttle portion (narrowed portion) 62*b* formed in a center part of the main pipe 62*a*, and an introduction pipe 62*c* orthogonally extending from the main pipe 62*a* at a point of the throttle portion 62*b*. The main pipe 62*a* includes an inlet 62*d* on its one end connected to the operation air supply path 63. To an inflow port 62*e* of the introduction pipe 62*c*, the produced water supply path 65 is connected. Further, the aspirator 62 is configured such that the operation air OA supplied into the inlet 62*d* of the main pipe 62*a* flows through the main pipe 62*a* and the operation air OA is increased its flow rate at the throttle portion 62*b*, thus generating the negative pressure according to the Venturi effect. This negative pressure causes aspiration of the produced water PW to the throttle portion 62*b* through the introduction pipe 62*c*, and the thus aspirated water PW runs into the operation air OA. As a result of this, the produced water PW is atomized and the atomized water PW is diffused and discharged out of an outlet 62*f* on the other end of the main pipe 62*a* to the atmosphere.

According to the produced water atomizing apparatus for the fuel cell in the above-mentioned embodiment, the produced water PW produced in the fuel cell 1 and stored in the produced water trap tank 61 is supplied to the aspirator 62 via the produced water supply path 65. Further, a part of the air, the air being emitted from the air pump 45 and supplied to the fuel cell 1, is supplied to the aspirator 62 via the operation air supply path 63 and utilized as the operation air OA for atomization of the produced water PW by the aspirator 62. Accordingly, the aspirator 62 itself does not need to be provided with a driving source, and there is no need in the aspirator 62 to provide another supply member such as a specialized pump including a motor for supplying the operation air OA. Therefore, the produced water PW can be atomized with a relatively simple configuration.

Furthermore, according to the configuration of the present embodiment, the air emitted from the air pump 45 is cooled by the intercooler 46 and then supplied to the fuel cell 1. On the other hand, the air to be utilized for the aspirator 62 as the operation air OA is supplied to the aspirator 62 via the operation air supply path 63 upstream of the intercooler 46. Namely, the air at a high temperature before cooling is supplied as the operation air OA to the aspirator 62. Accordingly, atomization of the produced water PW is further promoted by the operation air at the high temperature.

Second Embodiment

A second embodiment embodying the fuel cell system to an electric vehicle is now explained in detail with reference to the accompanying drawings.

Figure 3:
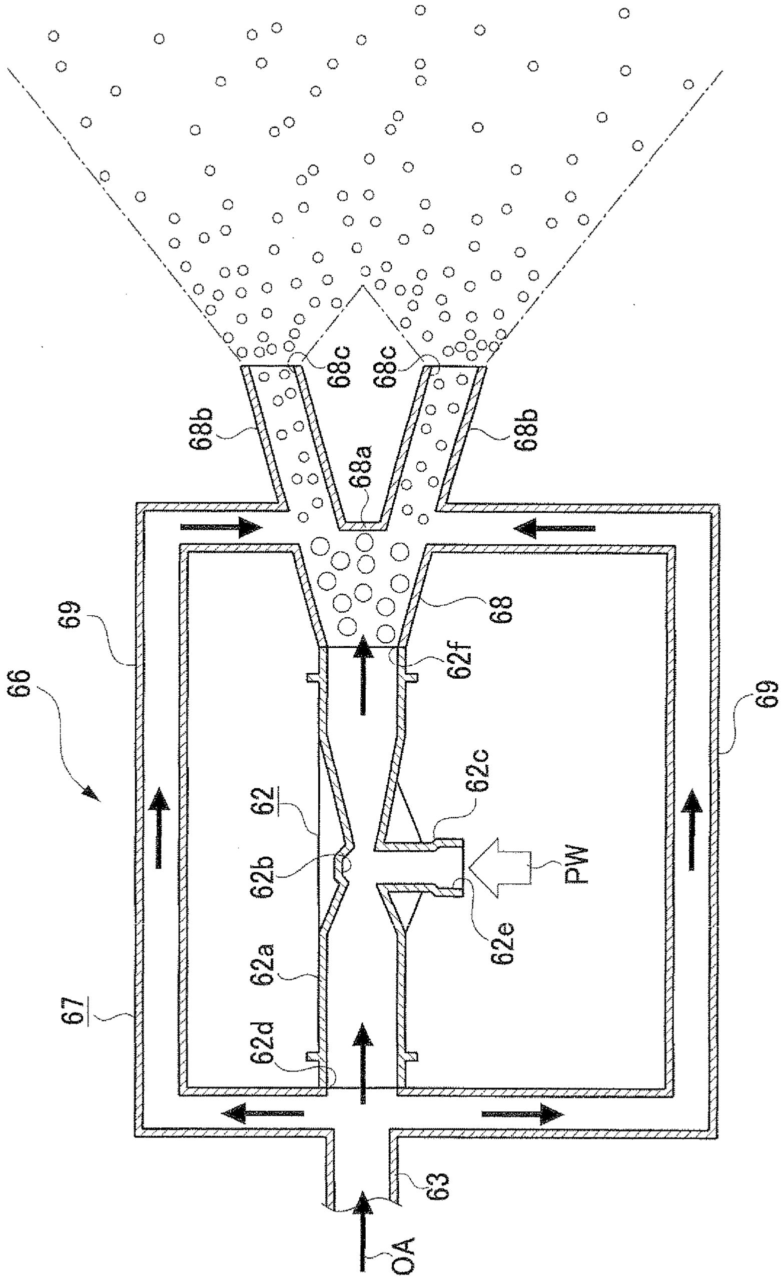
FIG. 3 is a sectional view showing a schematic configuration of an atomizing device including an aspirator in a second embodiment.

The present embodiment is different from the first embodiment in its configuration of the atomizing member. FIG. 3 is a schematic sectional view of an atomizing device 66 including the aspirator 62. In addition to the aspirator 62, this atomizing device 66 is provided with a pulverizer 67 to pulverize the atomized water droplets discharged from the aspirator 62 by use of the operation air OA. The pulverizer 67 includes a diffusion part 68 provided in an outlet 62*f* of the aspirator 62 and an air path 69 to guide a part of the operation air OA introduced into the inlet 62*d* of the aspirator 62 to the diffusion part 68. The diffusion part 68 further includes a diffusion plate 68*a* formed opposite to the outlet 62*f* of the aspirator 62 and a plurality of diffusion pipes 68*b* placed circumferentially around the diffusion plate 68*a*. The plurality of diffusion pipes 68*b* are each formed to extend in an outward direction on a vent 68*c* side. The air path 69 is bifurcated from the operation air supply path 63 to detour the aspirator 62 and introduced into the diffusion part 68 in the vicinity of the diffusion plate 68*a*.

Accordingly, the operation air OA introduced from the operation air supply path 63 to the aspirator 62 is used to atomize the produced water PW which has been introduced from the produced water supply path 65 to the aspirator 62 and discharge the atomized water PW out of the outlet 62*f*. The thus atomized water collides with the diffusion plate 68*a* of the diffusion part 68 and is further pulverized. Concurrently, the operation air OA flowing through the air path 69 is introduced in the vicinity of the diffusion plate 68*a* to sweep away the pulverized produced water (atomized water droplets) to the diffusion pipes 68*b*. Thus, the pulverized produced water (atomized water droplets) is discharged out of the vents 68*c* of the diffusion pipes 68*b*. In the atomizing device 66, the produced water atomized by the aspirator 62 is thus further pulverized by the pulverizer 67 and discharged outside. Accordingly, the produced water PW is further pulverized than the atomized state and the thus pulverized water (atomized water droplets) is diffused, so that vaporization of the water is promoted.

The present disclosure is not limited to the above embodiments and may be changed or modified as appropriate without departing from the essential characteristics thereof.

INDUSTRIAL APPLICABILITY

The present disclosure may be applied for a fuel cell system mounted in an automobile, for example.

REFERENCE SIGNS LIST

1 Fuel cell
2 Hydrogen supply unit (Fuel supply member)
3 Air supply unit (Oxidizer supply member)
4 Produced water atomizing apparatus
16 Hydrogen supply path (Fuel supply path)
41 Air supply path (Oxidizer supply path)
45 Air pump (Oxidizer pump)
46 Intercooler
61 Produced water trap tank
62 Aspirator (Atomizing member)
63 Operation air supply path (Operation fluid supply path)
65 Produced water supply path

What is claimed is:

1. A fuel cell system comprising:

a fuel cell configured to generate electricity with the supply of fuel and an oxidizer;

a fuel supply path configured to supply the fuel to the fuel cell;

an oxidizer supply path configured to supply the oxidizer to the fuel cell;

an oxidizer pump provided on the oxidizer supply path to pressure-feed the oxidizer to the fuel cell;

an aspirator configured to atomize produced water produced in association with generation of electricity in the fuel cell;

a produced water supply path configured to supply the produced water from the fuel cell to the aspirator; and an operation fluid supply path configured to supply operation fluid to the aspirator, wherein the oxidizer is used as the operation fluid and supplied to the aspirator, the oxidizer having been compressed and emitted from the oxidizer pump to be introduced in the operation fluid supply path through the oxidizer supply path, the system further comprises a pulverizer to pulverize water droplets of the atomized produced water which is discharged out of the aspirator, the pulverizer including a diffusion member, the pulverizer further includes a first path to guide a part of the operation fluid introduced into an inlet of the aspirator to the diffusion member, the pulverizer further includes a second path that is bifurcated from the operation fluid supply path to detour an other part of the operation fluid from the aspirator, the second path connected to the diffusion member and pulverizing, using the operation fluid, the water droplets of the atomized produced water which is discharged out of the aspirator, and the diffusion member extending from the outlet of the aspirator and including (1) a diffusion plate placed opposite to an outlet of the aspirator, the second path connected to the diffusion member in a vicinity of the diffusion plate, and (2) a plurality of diffusion pipes placed around the diffusion plate, the plurality of diffusion pipes extending downstream from the diffusion plate, being branched from each other, and defining a diffusion path for the pulverized water droplets, the plurality of diffusion pipes formed to extend in an outward direction on a vent side of the pipes.

2. The fuel cell system according to claim 1, wherein an intercooler is provided on the oxidizer supply path on a downstream side of the oxidizer pump to cool the oxidizer, and the operation fluid supply path is connected to the oxidizer supply path on an upstream side of the intercooler.

3. A fuel cell system comprising:

a fuel cell configured to generate electricity with the supply of fuel and an oxidizer;

a fuel supply path configured to supply the fuel to the fuel cell;

an oxidizer supply path configured to supply the oxidizer to the fuel cell;

an oxidizer pump provided on the oxidizer supply path to pressure-feed the oxidizer to the fuel cell;

an aspirator configured to atomize produced water produced in association with generation of electricity in the fuel cell;

a produced water supply path configured to supply the produced water from the fuel cell to the aspirator; and an operation fluid supply path configured to supply operation fluid to the aspirator, wherein the oxidizer is used as the operation fluid and supplied to the aspirator, the oxidizer having been compressed and emitted from the oxidizer pump to be introduced in the operation fluid supply path through the oxidizer supply path, an intercooler is provided on the oxidizer supply path on a downstream side of the oxidizer pump to cool the oxidizer, and the operation fluid supply path is connected to the oxidizer supply path on an upstream side of the intercooler.

4. The fuel cell system according to claim 3, wherein the system further comprises a pulverizer to pulverize tiny water droplets of the atomized produced water which is discharged out of the aspirator by use of the operation fluid, the pulverizer includes a diffusion member provided in an outlet of the aspirator and an air path to guide a part of the operation fluid introduced into an inlet of the aspirator to the diffusion member, the diffusion member includes a diffusion plate placed opposite to the outlet of the aspirator and a plurality of diffusion pipes placed around the diffusion plate, and the plurality of diffusion pipes are formed to extend in an outward direction on a vent side of the pipes, and the air path is bifurcated from the operation fluid supply path to detour the aspirator and connected to the diffusion member in the vicinity of the diffusion plate.

* * * * *